United States Patent
Brockenbrough et al.

(10) Patent No.: US 6,744,869 B2
(45) Date of Patent: Jun. 1, 2004

(54) METHOD AND SYSTEM FOR ONE PARTY TO PASS A CALLING INVITATION TO ANOTHER PARTY

(75) Inventors: Allan E. Brockenbrough, S. Hamilton, MA (US); Larry E. Ayres, North Andover, MA (US); Theresa Mendel, North Andover, MA (US)

(73) Assignee: Comverse, Inc., Wakefield, MA (US)

( * ) Notice: Subject to any disclaimer, the term of this patent is extended or adjusted under 35 U.S.C. 154(b) by 275 days.

(21) Appl. No.: 09/969,035

(22) Filed: Oct. 3, 2001

(65) Prior Publication Data

US 2003/0063735 A1 Apr. 3, 2003

(51) Int. Cl.[7] ............................................... H04M 3/42
(52) U.S. Cl. ............................ 379/201.11; 379/210.01; 379/210.03
(58) Field of Search ................. 379/201.01, 201.02, 379/201.11, 202.01, 204.01, 210.01, 210.03, 211.02, 901, 903

(56) References Cited

U.S. PATENT DOCUMENTS

| | | | | |
|---|---|---|---|---|
| 4,847,890 A | * | 7/1989 | Solomon et al. | 379/88.21 |
| 5,502,761 A | | 3/1996 | Duncan et al. | 379/142.01 |
| 5,509,064 A | * | 4/1996 | Welner et al. | 379/265.02 |
| 5,701,340 A | * | 12/1997 | Zwick | 379/204.01 |
| 5,818,836 A | * | 10/1998 | DuVal | 370/389 |
| 5,929,771 A | | 7/1999 | Gaskill | 340/7.54 |
| 6,148,067 A | | 11/2000 | Leipow | 379/201.01 |
| 6,157,829 A | | 12/2000 | Grube et al. | 455/414.1 |
| 6,175,619 B1 | | 1/2001 | DeSimone | 379/202.01 |
| 6,580,784 B2 | * | 6/2003 | Rodriguez et al. | 379/88.12 |

FOREIGN PATENT DOCUMENTS

| | | | |
|---|---|---|---|
| WO | 98/10558 | 3/1998 | H04L/9/00 |
| WO | 99/17241 | 4/1999 | G06F/17/60 |
| WO | 99/29127 | 6/1999 | H04Q/7/22 |
| WO | 00/39471 | 7/2000 | F16B/12/00 |
| WO | 00/51321 | 8/2000 | H04M/3/42 |
| WO | 00/65827 | 11/2000 | H04N/5/445 |
| WO | 00/69140 | 11/2000 | H04L/29/00 |
| WO | 00/75885 A1 | 12/2000 | G07F/7/10 |
| WO | 00/75893 A1 | 12/2000 | G08B/1/08 |
| WO | 01/10653 A1 | 2/2001 | B42D/15/10 |
| WO | 01/22347 A1 | 3/2001 | G06K/7/10 |
| WO | 01/31903 A1 | 5/2001 | H04M/3/56 |
| WO | 01/35574 A1 | 5/2001 | H04L/9/32 |

OTHER PUBLICATIONS

Web Page, verizonld.com/home/ptfs/index.htm, *Verizon Long Distance*, Sep. 15, 2001, p. 1.
Web Page, verizonld.com/home/ptfs/ptfsdetails.htm, *Verizon Long Distance*, pp.1–2, Sep. 15, 2001.
Web Page, salon.com/tech/view/2000/05/15/colly_myers/ *Salon Technoloy*, pp. 1–4, Sep. 15, 2001.

* cited by examiner

*Primary Examiner*—Harry S. Hong
(74) *Attorney, Agent, or Firm*—Staas & Halsey LLP (57) ABSTRACT

A method and apparatus facilitates voice, text, pager or e-mail communication between first and second parties. The second party requests a token from the first party, wherein the token is associated with contact information, such as a telephone number, but does not reveal the telephone number. The first party, at their discretion, provides the token to the second party. The second party is then able to contact the first party by using the token but without knowing the contact information, such as the telephone number, of the first party.

33 Claims, 11 Drawing Sheets

FIG. 3B e-Calling Card Table Database Record

| Unique Key | Owner Subscriber Id | Participant Subscriber Id | Creation Date | Last Used Date | Number Of Times That Card Can Be Used | Expiration Date | Privacy |
|---|---|---|---|---|---|---|---|
| | | | | | | | |

METHOD AND SYSTEM FOR ONE PARTY TO PASS A CALLING INVITATION TO ANOTHER PARTY

BACKGROUND OF THE INVENTION

1. Field of the Invention

The present invention is directed to a method and system for facilitating communication between first and second parties, and particularly to a method and system whereby a party can pass an electronic calling card or token to a second party to facilitate communication between the parties without revealing any contact information, such as, the telephone number of the first party.

2. Description of the Related Art

It is common in social situations that a person will meet another person for the first time and will want to provide the new acquaintance with a method of contacting them. In the prior art, this is usually done by providing the new acquaintance with a telephone number. This procedure has a drawback however, in that once the telephone number is provided to the new acquaintance, the telephone number cannot be retracted. Therefore, if after several conversations, it becomes clear to the party that they do not have any interest in further contact with the new acquaintance, there is no way to prevent the new acquaintance from continuing to call the party's telephone number even if the party requests the new acquaintance to stop. As a result, the party who passed out the telephone number to the new acquaintance has no way to prevent the new acquaintance from continuing to call, other than by changing the party's telephone number to avoid future calls.

Therefore, there is a need in the art for a system which allows a party to provide a new acquaintance with a method of contacting the party but does not actually provide the party's telephone number to the new acquaintance.

SUMMARY OF THE INVENTION

In one aspect, the present invention seeks to overcome the disadvantages of the prior art described above, by providing an improved method for facilitating communication between first and second parties, wherein one party supplies a token to the other party to facilitate the communication. The token is associated with contact information such as a telephone number, but does not reveal the contact information. This allows a first party to contact a second party without having the telephone number of the second party revealed.

In one embodiment of the present invention, wireless telephones and a server are used to create a token and to have a call placed between the wireless telephones without either of the wireless telephone users knowing the actual telephone number of the other user.

In another embodiment of the present invention, no server is used, and instead the wireless telephones include applications for creating and storing a token, and for using a token to arrange for communication between the wireless telephone users without either of the users knowing the other user's actual telephone number.

In another embodiment of the present invention, local communication between the wireless telephone handsets is eliminated and the e-calling card or token is passed between users either verbally or in written form.

In still another embodiment of the present invention, landline telephones are used together with a server to create a token and to arrange for communication between the landline telephones.

These together with other features and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
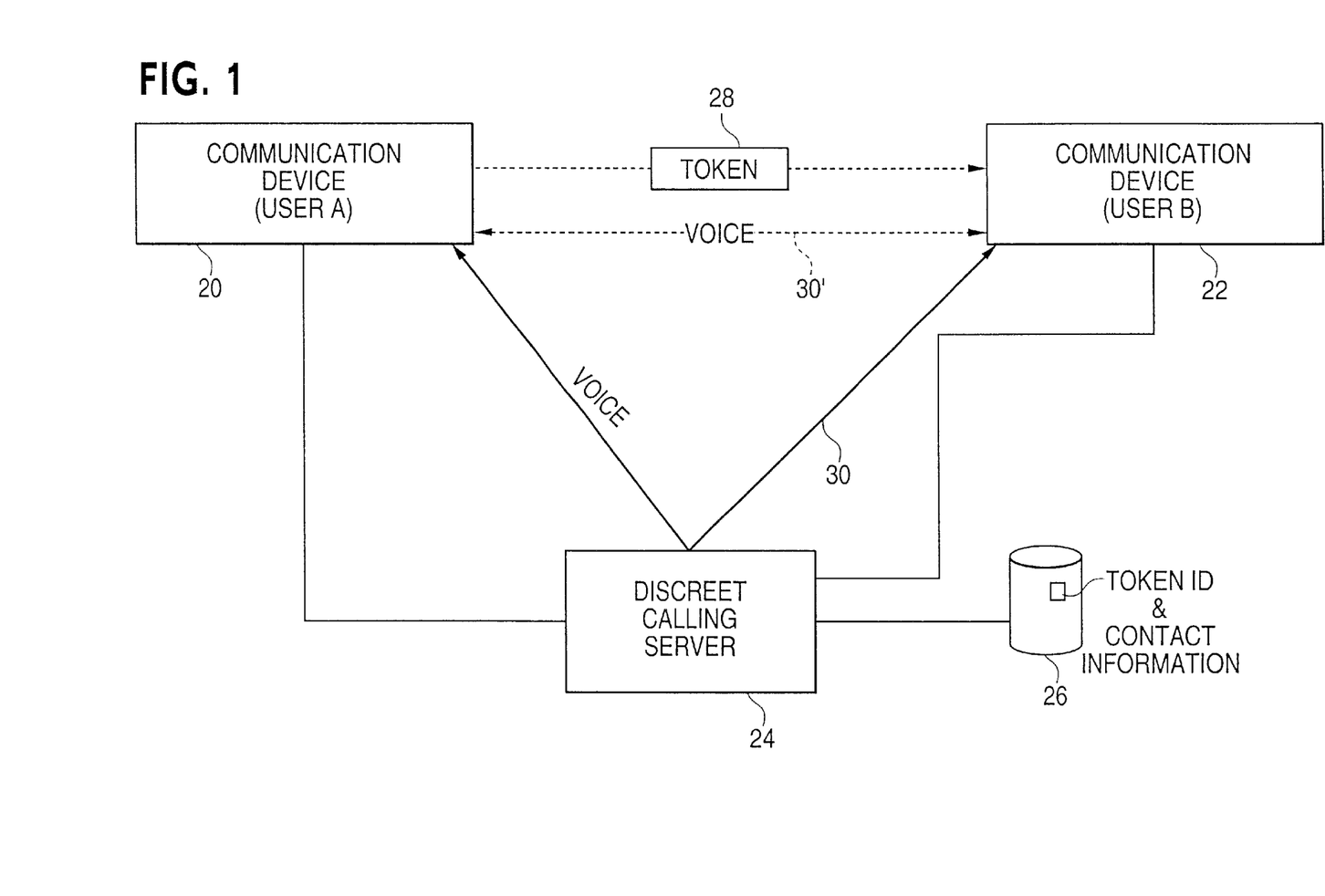
FIG. 1 is a diagram depicting the components of the system of the present invention.

FIG. 1 is a diagram of an embodiment of the present invention, including communication devices 20 and 22 which may be wireline or wireless telephone handsets, connected to a computer or server 24 which may be referred to as a discreet calling server or a secret calling server. A database 26 is stored on the server 24 in order to store contact information (for example, a telephone number) and a corresponding token identification information.

Referring to the example where the communication devices 20 and 22 are wireless telephone handsets, in operation a user of communication device 22 (user B) may be interested in communicating with a user of communication device 20 (user A). The communication devices 20 and 22 may be wireless handsets, wireline handsets, computers, facsimile equipment, personal digital assistants, pagers or any other type of communication device. User B of communication device 22 requests a token 28 from user A of communication device 20. The token 28 provides information which corresponds to, but does not reveal, contact information (e.g., a telephone number, a fax number, a pager number or an e-mail address) of the communication device 20 of user B. The token 28 is also referred to as an e-calling card, an electronic calling card, an electronic calling aid, an e-card, a unique key, a key, a pseudo-telephone number, a virtual telephone number, or simply a card. User B communicates the request for token 28 to user A either electronically or manually. If user A is interested in providing token 28 to user B, then user A requests a new token from the discreet calling server 24 via the communication device 20. In the request, the subscriber ID of user A is passed to the server 24. The server 24 creates an entry in the database 26 containing a unique key or token identification corresponding to the token and contact information such as the telephone number of user A. The server 24 passes the token back to the handset 20 of user A and user A then passes the token 28 to user B, either manually or by electronic communication, such as local wireless communication between the communication devices 20 and 22. User B can then use communication device 22 and token 28 to transmit the token information to the server 24 in order to set up a voice communication between the communication devices 20 and 22 of user A and user B. The server 24 can set up a voice connection between communication devices 20 and 22 either through the server 24 or via another implementation such as AIN in which the server 24 can cause a direct connection 30' between communication devices 20 and 22.

Figure 2:
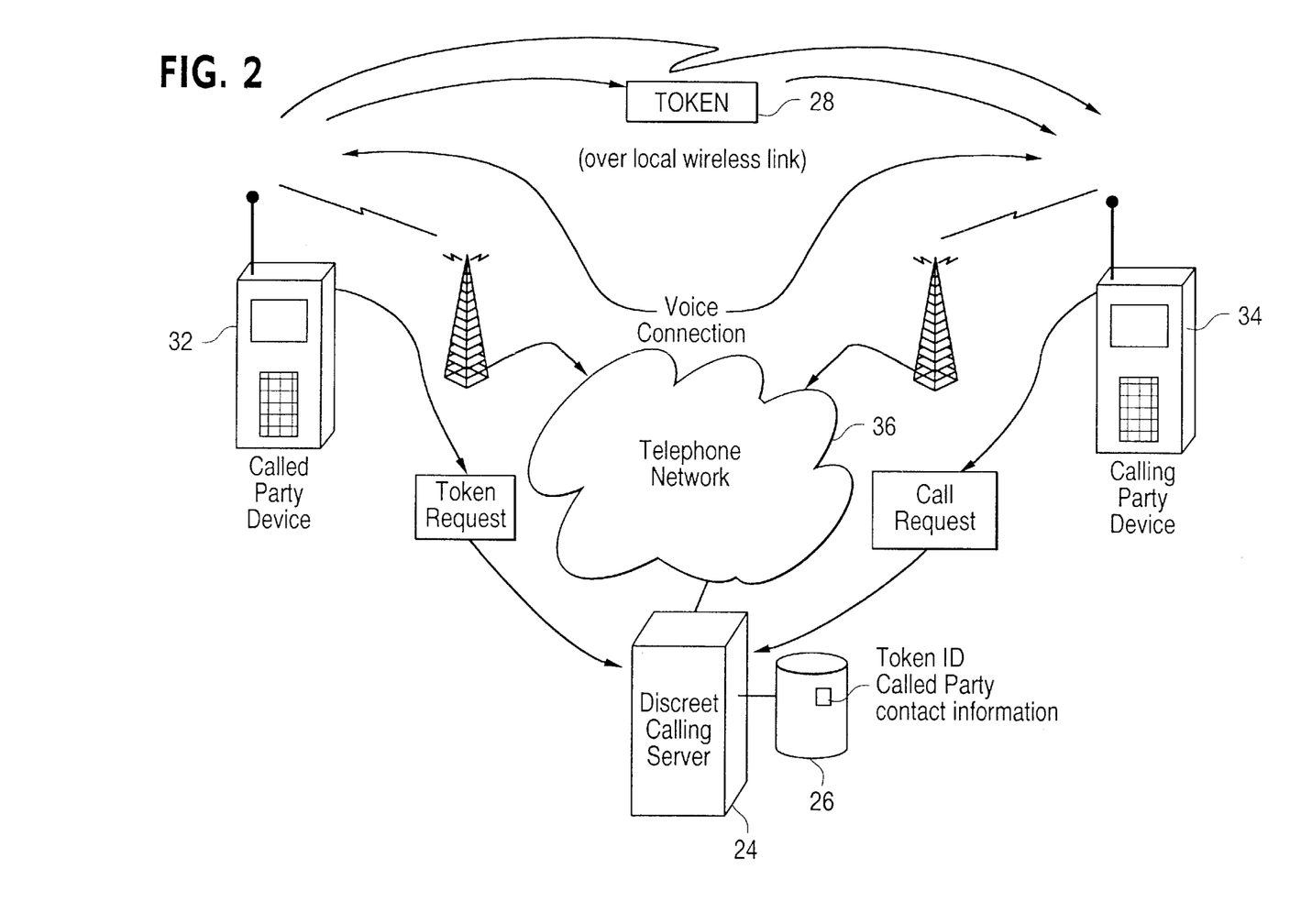
FIG. 2 is a more detailed diagram of the components of the present invention, as implemented for use with wireless handsets.

FIG. 2 is a more detailed diagram of the embodiment of FIG. 1 in which the communication devices 20 and 22 are illustrated as wireless handsets 32 and 34 which communicate over a telephone network 36 which is in turn connected to the discreet calling server 24. In this aspect of the embodiment of FIG. 1, the request for the token 28 from handset 34 to handset 32 is provided over a local wireless link, and the token 28 is also provided from handset 32 to handset 34 over the local wireless link. The token request from the handset 32 to the server 24 and the call request from the handset 34 to the server 24 are carried out via the telephone network 36 in the manner described above with respect to FIG. 1.

As illustrated in FIG. 2, the server 24 is connected to the telephone network 36 and may be operated by any wireline or wireless service provider. For example, the features of the invention may be implemented by a server on the Trilogue Infinity™ or Access NP® platforms of Comverse, Inc. Alternatively, a third party service bureau may set up its own server 24 for producing e-calling cards.

Figure 3A:
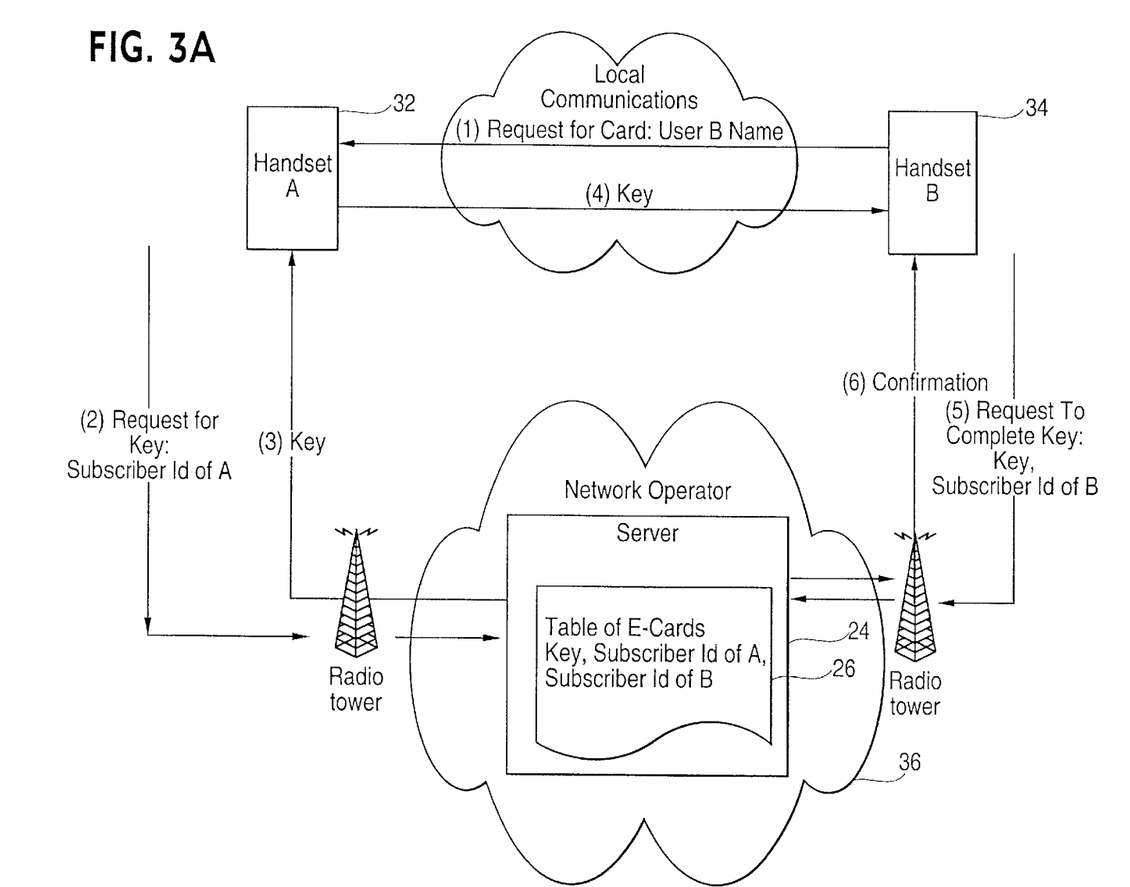
FIG. 3A is a diagram illustrating an embodiment of the present invention in which the handsets are capable of local communication.
Figure 3B:
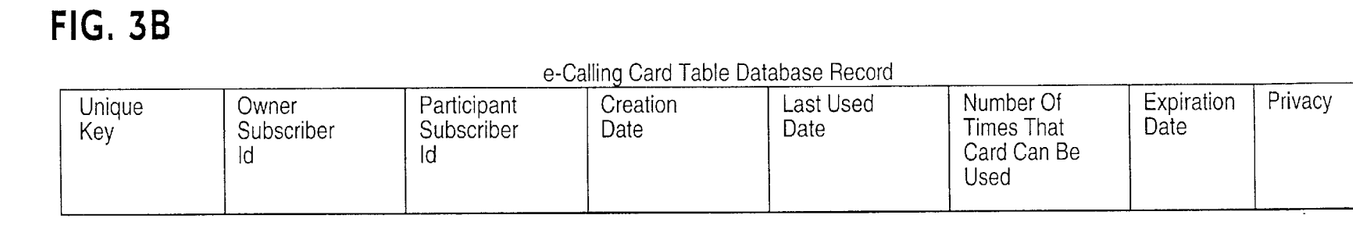
FIG. 3B is an e-calling card table database record which is stored in the database 26 of FIG. 2.
Figure 4:
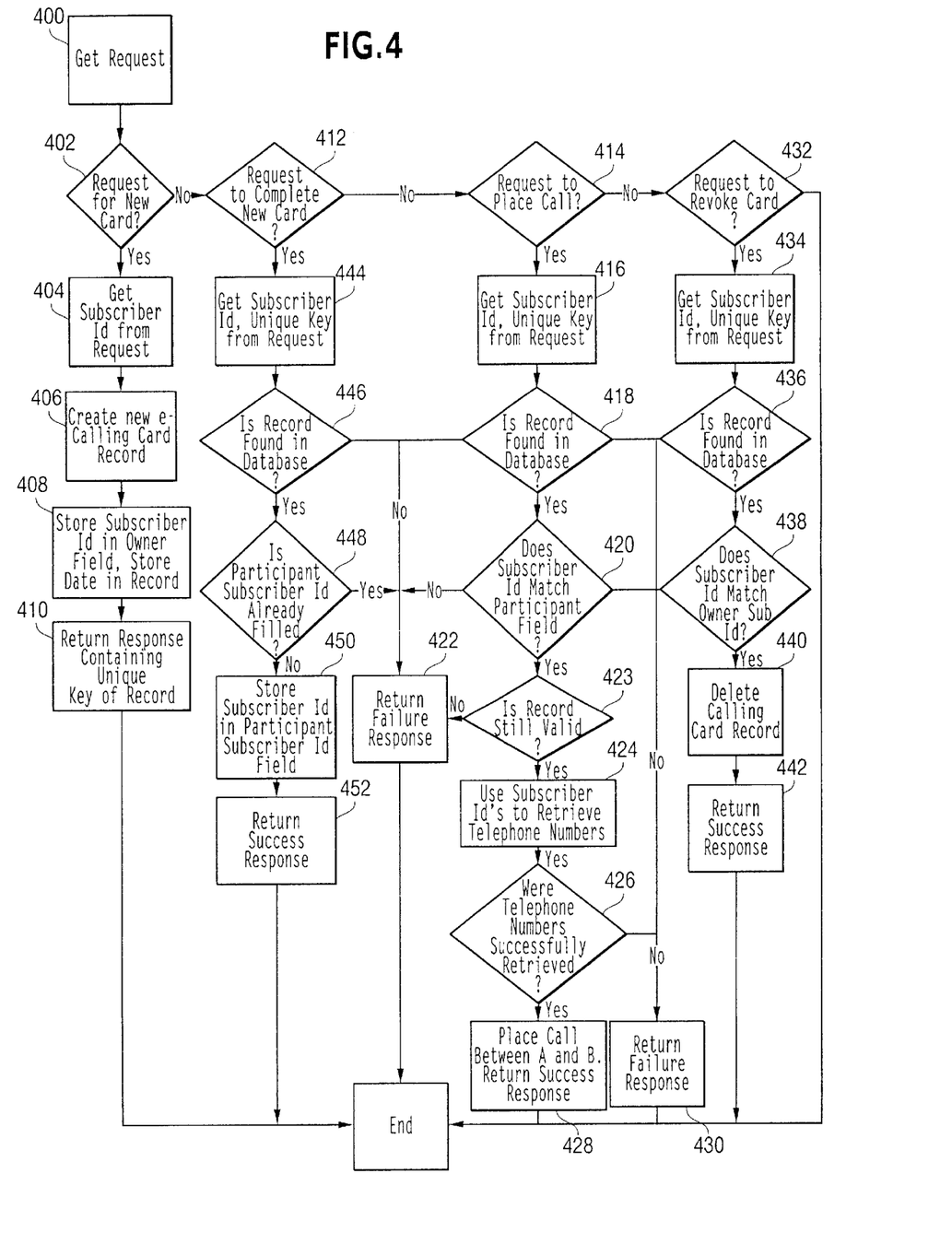
FIG. 4 is a flowchart illustrating the process performed by server 24 to create a new e-calling card, complete a card, place a call using a calling card and revoke a calling card.

The process for requesting a token 28 is described below with respect to the diagrams of FIGS. 3A and 3B and the flow chart of FIG. 4. In these diagrams, the token 28 is referred to as a key or a unique key. Referring to FIGS. 3A and 4, the user of handset 34 (user B) requests an e-calling card by invoking an e-calling card application on handset 34. Specifically, the user of handset B selects a "request an e-calling card" option. The handset 34 initiates local communication with handset 32 using a local inter device communication protocol such as the IRDA (Infrared Data Association) protocol. Handset 34 communicates the request for an e-calling card, and the request includes user B's name. This name is an informal tag (e.g., "Sam") and not the subscriber ID for the handset 34 of user B.

If the user of handset 32 (i.e., user A) rejects the request then the rejection is communicated to handset 34 and the process ends. If user A accepts the request, then an e-calling card application on handset 32 requests a new e-calling card key from the server 24. The request includes the subscriber ID of user A.

As an alternative, the request made via handset 34 to the handset 32 can be eliminated. Instead, handset 32 could push an e-calling card to handset 34 and local software on handset 34 could provide an interface allowing the user of handset 34 to accept or reject the offered calling card.

When the server 24 recognizes a request for a new card at 400 and 402 in FIG. 4, then the subscriber ID of user A is obtained from the request at 404 and a new e-calling card record is created at 406. As described above, the server 24 contains a database 26 of e-calling cards which may be encrypted for security purposes. FIG. 3B is a diagram of a row in the e-calling card table which is stored in the server database 26. Each row corresponds to an e-calling card. The fields in the database include a unique key field which uniquely identifies a row (i.e., the e-calling card). The owner subscriber field contains the subscriber ID of the person who owns the calling card record. This is the person (user A in the above example) who will pass the calling card out to another person. The owner subscriber ID can simply be the telephone number or any other identification which allows the telephone number of the subscriber to be located.

The participant subscriber ID field contains the subscriber ID of the person (user B in the above example) who will receive the calling card. This subscriber ID can also be the telephone number or any other identification which allows the telephone number to be located.

The creation date field is an optional field which identifies the date and time the record was originally created. The last used date field is also an optional field which identifies the date the record was last used to place a call.

The number of times that card can be used field is another optional field which can be used to control the number of times the e-calling card can be used before it is automatically deactivated. For example, a user A could set a number 3 for this field, assuming that after three contacts, user A would provide their actual phone number or reissue a new e-calling card. The expiration date field is an optional field identifying the date after which the e-calling card can no longer be used. The privacy field is an optional field which can be set by the subscriber owning the record to limit the distribution or redistribution of the key.

Referring back to FIG. 4, the server 24 stores the subscriber ID of user A in the owner field in the database 26 and also stores the date at 408. The server 24 then provides a return response to user A containing the unique key or token at 410. Then user A is able to pass the unique key or token and the user name of user A (not the telephone number) to handset 34 by using an application on handset 32.

The process for completing the e-calling card is described with reference to FIG. 3A and FIG. 4. After receiving the key or token 28, user B of handset 34 can then forward a request to the server 24 to complete the new e-calling card 24. If the server 24 recognizes a request to complete a new e-calling card at 412, then the server 24 obtains the unique key and the subscriber ID from user B at 444. It is then determined whether the corresponding record is found in the database 26 at 446. If so, then it is determined whether the participant subscriber ID field (see FIG. 3B) is already filled in at 448. If so, or if no record is found in the database then a failure response is returned at 422. If the participant subscriber ID field is not already filled in, then the subscriber ID of user B is stored in the participant subscriber ID field at 450 and a return success response is sent at 452.

Figure 5:
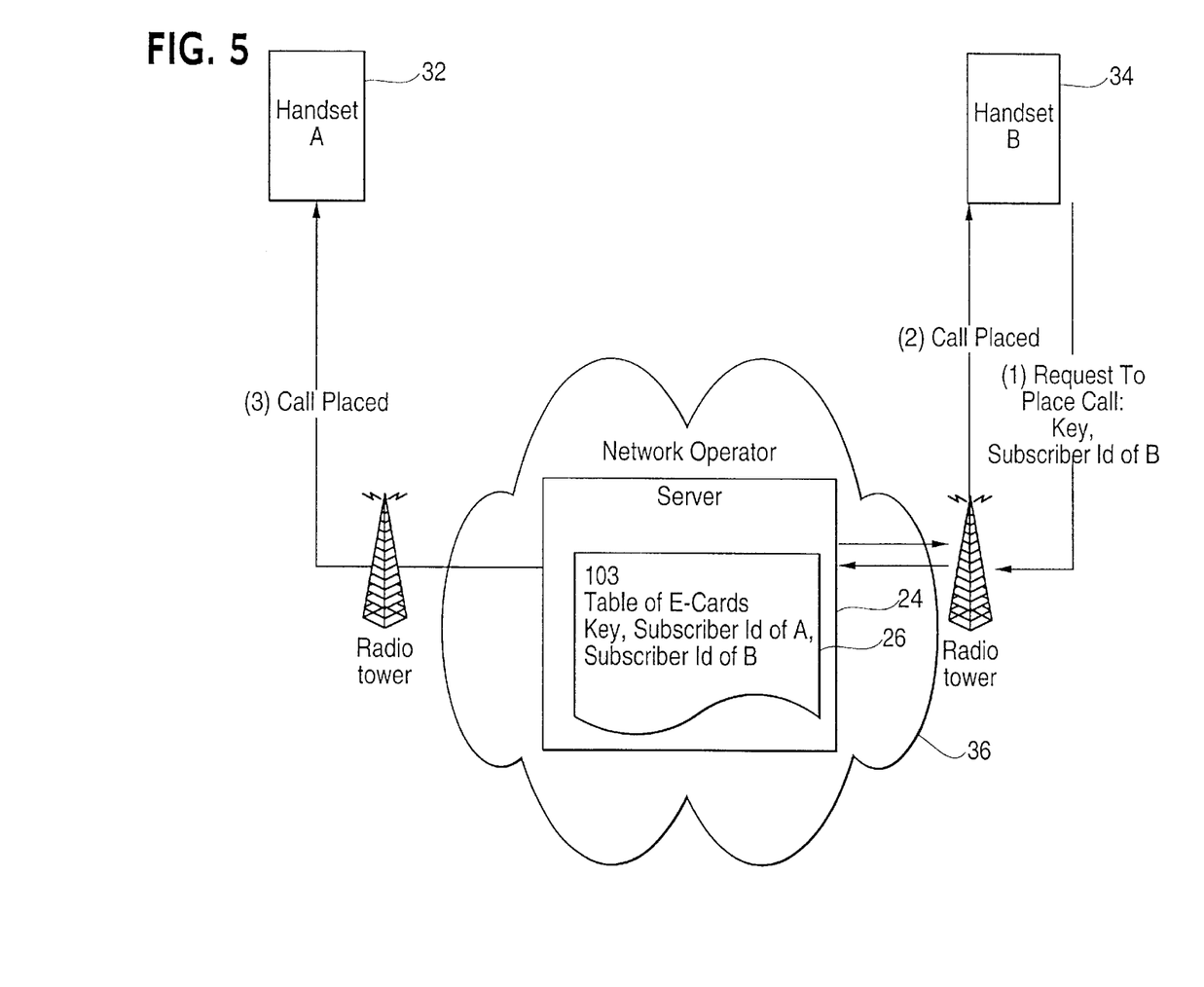
FIG. 5 is a diagram illustrating an embodiment of the present invention in which a handset requests the server 24 to place a call.

The process for completing a call based on a received e-calling card is described with reference to the diagram of FIG. 5 and the flow chart of FIG. 4. As illustrated therein, an application on handset 34 makes a request to the server 24 to complete a call to user A. The application on handset 34 locally stores the token and the associated user name of user A. When user B invokes the calling card application on handset 34, user B selects "place an e-calling card call" option. As a result, a list of stored e-cards is displayed. For each calling card, an associated name and the date the card was stored, are displayed. User B selects the desired calling card (e.g., the calling card of user A) from the list and the application makes a request to the server 24 to place a call. The request includes the unique key or token of the calling card and the subscriber ID of user B. Referring to FIG. 4, when the server 24 gets a request at 400 and determines that the request is not a request for a new card at 402, then server 24 determines whether it is a request to complete a new card at 412. If not, the server 24 then determines whether the request is a request to place a call at 414. If so, then the subscriber ID and the unique key are obtained from the request at 416, and it is then determined whether the record is found in the database 26 at 418. If so, then the subscriber ID of user B is compared with the stored entry in the database for the participant ID to see if there is a match at 420. If there is not a match at 420 or if no record is found in the database at 418, then a return failure response is generated at 422 and the process is completed. If a match is found then it is determined whether the record is still valid at 423 and if so, then the subscriber ID of user A is used to retrieve corresponding telephone numbers for users A and B at 424. An alternative to the above approach is to omit checking the subscriber ID of user B. This enables the e-calling card to be used from many phones instead of requiring that it be used at user B's handset 34.

If it is determined that the telephone numbers were successfully retrieved at 426, then a call is placed between handsets 32 and 34 and a success response is returned at 428. If the telephone numbers are not successfully retrieved, then a return failure response is generated at 430.

Billing information is stored so that user B of handset 34 can later be billed for the call. User A of handset 32 may also be billed for using the e-calling card service.

As illustrated in FIG. 4 a subscriber (e.g., user A) can revoke an e-calling card which has been given out (e.g., to user B) at any time. To do this, user A sends via his handset 32 a request to the server 24 to delete a specific e-calling card (or calling cards). At 432, the server 24 determines whether a "request to revoke an e-calling card" has been made, and if so, the server obtains the subscriber ID of user A and the unique key from the request at 434. It is then determined whether the record is found in the database at 436. If so, the server determines whether the subscriber ID matches the owner subscriber ID at 438. If so, then the calling card record is deleted at 430 and a response is returned to the handset indicating that the card has been successfully revoked at 442.

The primary requirements for the handsets 32 and 34 include the ability to locally transfer information between handsets in close physical proximity, the ability to communicate with the sever 24 and the ability to locally store information such as the token or key 28 on the handset.

The above requirements can be met by handsets currently available in the market-place. For example, Symbian's EPOC technology provides an operating system that provides Internet connectivity and implementation of the standard IrDA (Infrared Data Association) protocol suite. The IrDA protocol suite includes the IrDA Object Exchange (IrOBEX) protocol. The IrOBEX provides a protocol that can be used for exchanging information (such as the e-calling card information described above) between multiple devices equipped with infrared or BlueTooth capability. The model R380 mobile telephone from Ericcson is an example of a handset that is loaded by the manufacturer with the EPOC operating system, has infrared capability and has a local storage capability. The handset application for implementing the above-described features can be implemented using, for example, the C++ programming language.

Figure 6:
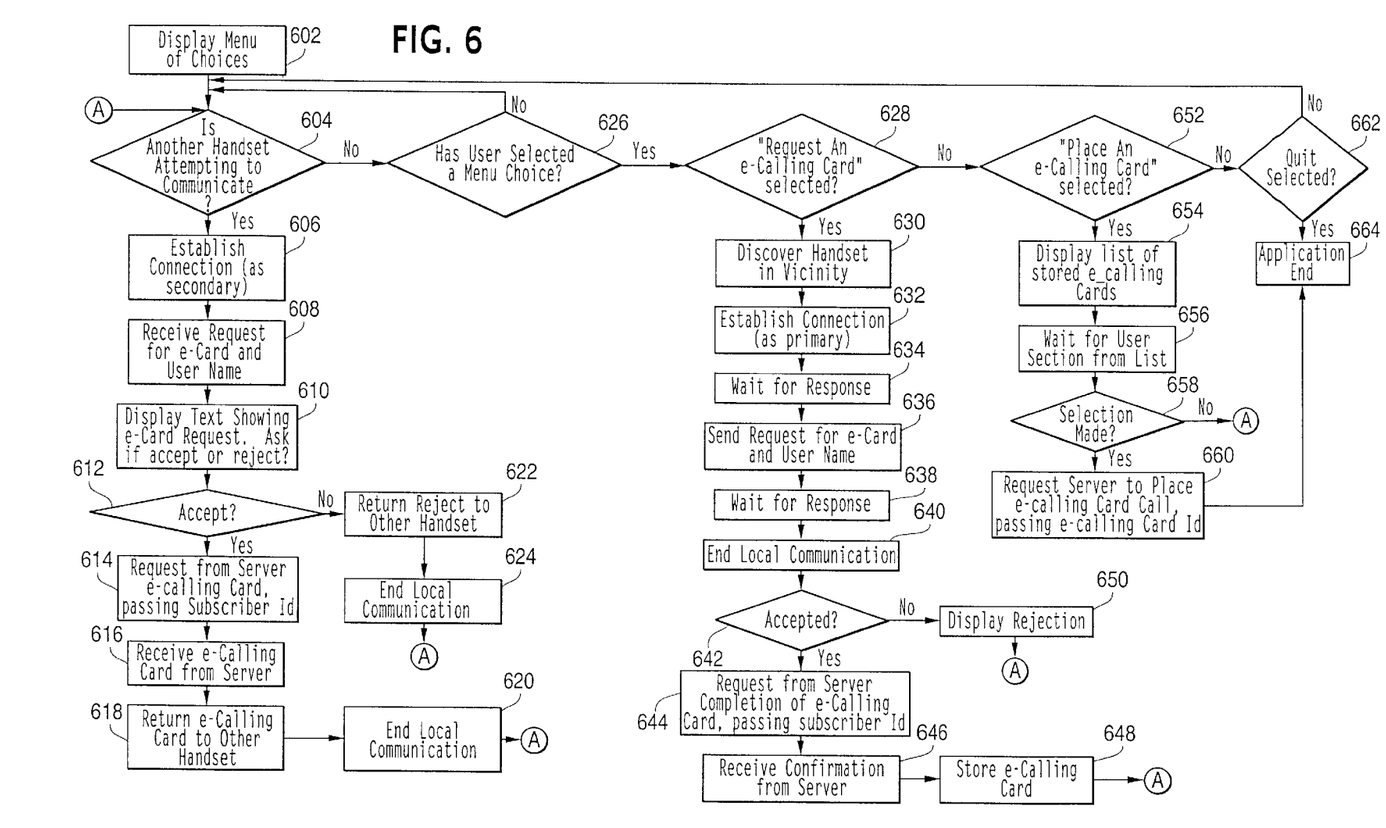
FIG. 6 is a flowchart illustrating the process which is performed by a handset to request an e-calling card, receive a request for an e-calling card, and place an e-calling card call.

FIG. 6 is a flow chart of the handset application which is run on the handsets 32 and 34. Upon actuation of an appropriate button on the handset, a set of menu choices is displayed at 602. It is determined whether another handset (e.g., handset 34) is attempting to communicate with the subject handset (e.g., handset 32) at 604. If so, a connection is established at 606 and a request for an e-card and a user name are received at 608. Then, a text showing an e-card request is displayed, and the display asks if the request is accepted or rejected at 610. If it is determined that the request is accepted at 612, then a request is sent to the server 24 to request an e-calling card at 614. The subscriber ID is passed with the request. After the server processes the request as illustrated in FIG. 4, the server sends the e-calling card to the handset (e.g., handset 32) and the handset receives the e-calling card at 616. The handset (e.g., handset 32) then returns the e-calling card to the handset requesting the e-calling card (e.g., handset 34) at 618 and local communication is completed at 620. If the user of the handset (e.g., handset 34) rejects the request for an e-calling card as determined at 612 then a notice of rejection is returned to the other handset at 622 and local communication is ended at 624.

If it is determined at 604 that another handset is not attempting to communicate with the subject handset, it is determined whether the user of the handset has selected a menu choice at 622. If a menu choice has been selected, then it is determined whether a "request for an e-calling card" has been selected at 628. If so, then a process of discovering a handset in the vicinity of subject handset occurs at 630 and a connection is established at 632. The handset waits for a response at 634 and then sends a request for an e-card together with the user name of the subject (e.g., user A) at 636. The handset waits for a response at 638 and then ends local communication at 640. If it is determined that the request is accepted at 642, then the handset requests from the server 24 the completion of the e-calling card, passing the subscriber ID (of user A) to the server at 644. Confirmation is received from the server at 646 and the e-calling card is stored in the handset at 648. If it is determined that the "request for an e-calling card" has not been accepted at 642 then the handset displays a notice of rejection at 650.

If it is determined that a "request for an e-calling card" has not been selected at 628, then it is determined whether the menu item for "placing an e-calling card call" has been selected at 642. If so, then a list of stored e-calling cards is displayed at 654 and the handset waits for the user to select from the list at 656. It is determined whether a selection is made at 658, and if a selection is made, a request is sent to the server to place an e-calling card call at 660. An e-calling card ID is sent to the server 24 and the call is placed in the manner illustrated in FIG. 4. If it is determined that placing an e-calling card call has not been selected at 652, then it is determined whether "quit" is selected at 662. If so, then the application is ended at 664.

Although the features of the present invention has been described in the context of voice communications, the same approach can be used to establish an SMS (text messaging)

conversation between the parties. Instead of the server 24 placing a telephone call, the server 24 relays text messages between the handsets 32 and 34.

In addition to the features described above, the features of the present invention can be used to establish an SMS or voice conversation without the subscribers being aware of the e-calling card. After handset 34 receives the unique key for an e-calling card from handset 32, the application for the handset 34 can immediately request that a phone conversation (or a text message relaying) be established. In this case, the concept of the e-calling card is not exposed to the user, and the e-calling card would not be stored locally on handset 34.

As another alternative the participant subscriber ID is passed to the server 24 when the e-calling card is initially created. This eliminates the later step of the participant (e.g., user B using handset 34) communicating this information to the server to complete the e-calling card. This would require that the participant (user B) pass his subscriber ID to the owner's handset (e.g., handset 32) prior to the creation of the e-calling card.

Figure 7:
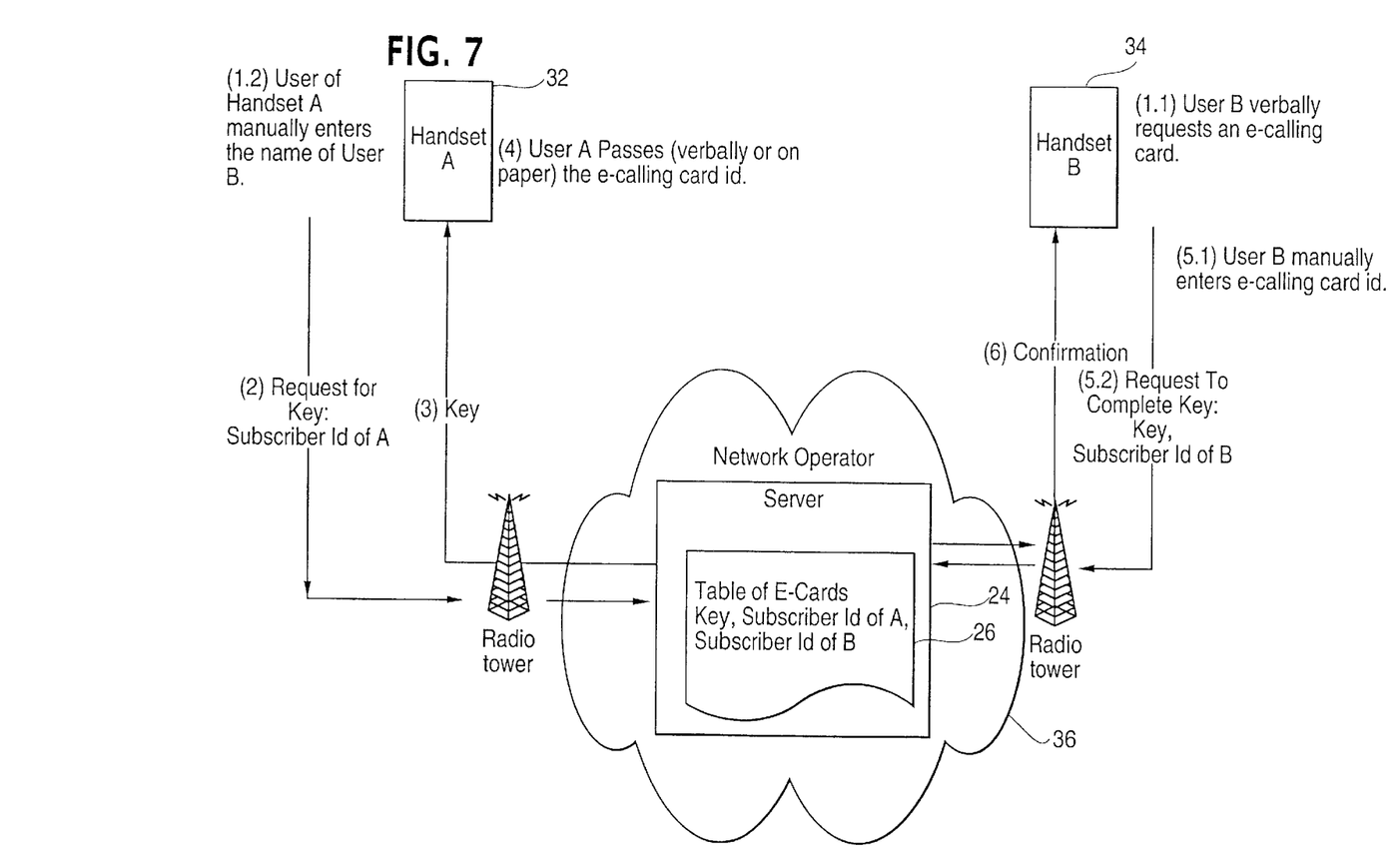
FIG. 7 is a diagram that illustrates an embodiment of the present invention in which one user passes a token to another user either verbally or on paper.

In an alternative embodiment of the present invention, the local communication between handsets 32 and 34 to pass the e-calling card is eliminated. Instead, the user of handset 32 could pass the e-calling card or token to the user of handset 34 either verbally or on a piece of paper. The user of handset 34 would then manually enter the e-calling card ID into the handset 34. This embodiment is illustrated by the diagram of FIG. 7 which shows that upon request by user B, user A manually enters the name of user B into handset 32 and then enters a request for a key which provides the subscriber ID of user A to the server 24. The server 24 then provides a key to the handset 32 which user A then passes verbally or on paper to user B. User B then manually enters the key or e-calling card ID into the handset and sends a request to the server 24 to complete the key. This request includes both the key and the subscriber ID of user B. The server 24 processes this information and then sends a confirmation to handset 34 that the e-calling card has been set up. The user B can then have the server 24 set up a call in the manner illustrated in FIG. 4.

Figure 8:
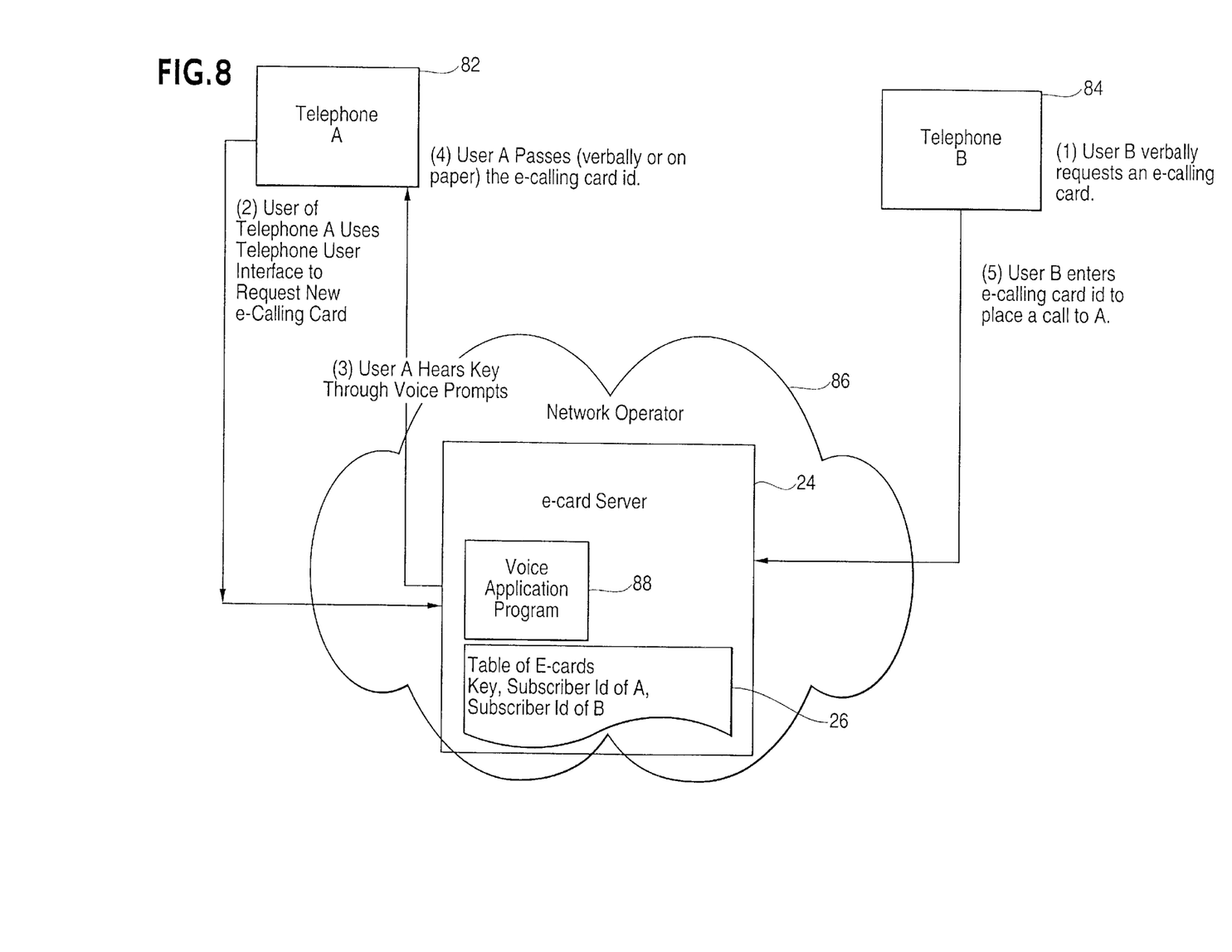
FIG. 8 is a diagram illustrating an embodiment of the present invention which is adapted to a wireline environment.

FIG. 8 is a diagram of an alternative embodiment of the present invention for use with landline telephones 82 and 84 instead of wireless handsets. In a landline solution, telephone users interact with a telephone user interface (TUI) program 88 running on the server 24. The TUI program 88 plays audio prompts that prompt information input and report results. The user can interact with the TUI through DTMF commands or automatic speech recognition. Thus, TUI takes the place of software that was described above as residing locally on the wireless handsets 32 and 34. In this embodiment, user B verbally requests an e-calling card from user A who uses telephone 82 and the telephone user interface 88 to request a new e-calling card. User A is provided with the key through a series of voice prompts, and then passes the key or e-calling card ID to user B either verbally or on paper. User B then enters the e-calling card ID using telephone 84 in order to place a call to user A through the server 24.

In another alternative embodiment, no server is used to control the creation of e-calling cards. Instead, a handset application on handsets 32 and 34 performs the function of the server 24 by locally creating an e-calling card and passing it to another handset. For example, referring to FIG. 3A, if the server 24 is omitted, then handset 32 passes an e-calling card to handset 34. The e-calling card contains a telephone number of user A, the user name associated with the handset 32 and an expiration condition (for example, the number of times an e-calling card can be used or its expiration date).

Figure 9:
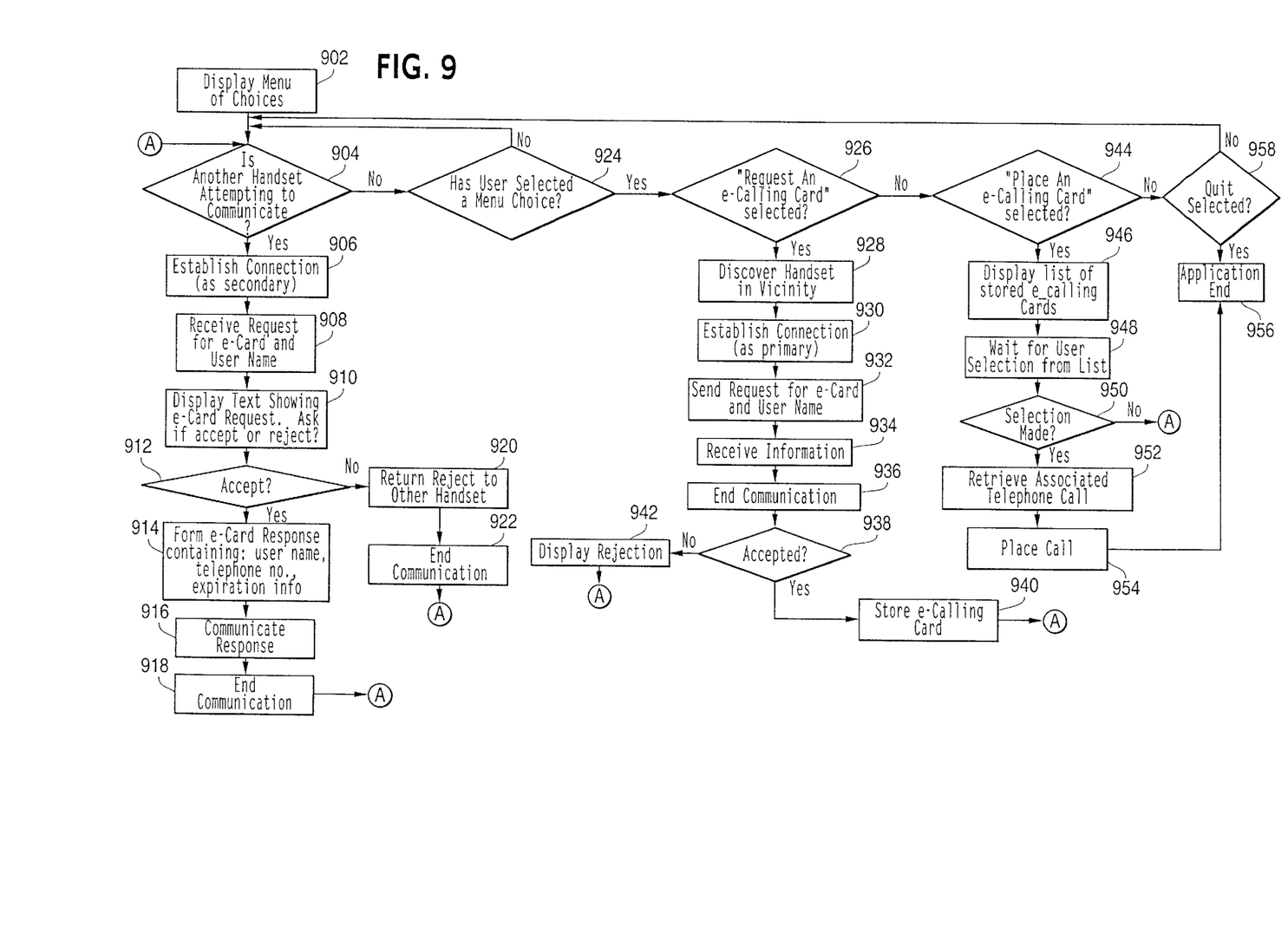
FIG. 9 is a flowchart of the application which is run on a handset where no server is required to create an e-calling card.

FIG. 9 is a flowchart of the application which is run on the handset (e.g., handset 32) when no server is used to create an e-calling card. A menu of choices is displayed on the handset (e.g., handset 32) at 902 and it is determined whether another handset (e.g., handset 34) is attempting to communicate with the handset (handset 32) at 904. If so, then a connection is established at 906 and a request for an e-calling card and a user name are received at 908. Text is then displayed to the handset user to show an e-card request and ask if the request should be accepted or rejected at 910. It is determined whether the request is accepted at 912 and if so, an e-card response is formed which contains a user name, a telephone number and expiration information at 914. This response is then communicated to the requesting handset at 916 and the communication is ended at 918.

If at 912 it is determined that a "request for an e-calling card" has been rejected, then a rejection notification is returned to the other handset at 920 and communication is ended at 922. If it is determined at 904 that another handset is not attempting to communicate then it is determined whether the user has selected a menu choice at 924 and if so, then it is determined whether a "request for an e-calling card" has been selected at 926. If so, then the handset (e.g., handset 32) looks for another handset (e.g., handset 34) in the vicinity at 928 and establishes a connection at 930. A request for an e-card and a user name are then sent at 932, information is received at 934, and communication is ended at 936. If it is determined that a request for an e-calling card is accepted at 938 then the e-calling card is stored at 940. If not, then a rejection notification is displayed at 942.

If it is determined that a "request for an e-calling card" was not selected at 926 then it is determined whether a "place an e-calling card call" was selected at 944. If so, a list of stored e-calling cards is displayed on the handset at 946 and the handset waits for a selection by the user from the list at 948. If it is determined that a selection is made at 950 then the associated telephone number is retrieved (note that the associated telephone number is not displayed to, or available to, the user) at 952 and a call is placed at 954. After the call is placed the application ends at 956. If a "place an e-calling card request" is not selected at 944, then it is determined whether "quit" is selected at 958. If so, then the application is ended.

In the above-described serverless embodiment of the invention, an application running on, for example, handset 34 receives the e-calling card from handset 32 and stores the card locally on handset 34. The application can recall stored e-calling cards and display the e-calling cards in a list. The list shows the user name corresponding to the e-calling card and any relevant expiration information. The associated telephone number is not displayed. The user can thereby select an e-calling card for placing a call. The application uses the associated telephone number to place a call but the telephone number is not displayed as part of placing the call.

The above approach can also be used to establish a voice conversation without the subscribers being aware of a calling card. In this case, the application on handset 34 receives the calling card information and immediately places the call. The e-calling card information would not be stored locally or on a server, and the subscribers would be unaware of its existence. There would be no need for expiration information since an e-calling card could only be used once in this approach.

Examples of actual usage of the invention are described below with reference to the screen shots of FIGS. 10A–10D.

In scenario one, Sam and Carol are strangers riding on a crowded train. Sam would like to send some text messages (SMS) to Carol, but having never met her, he doesn't know her number. Sam catches Carol's attention and points his phone at hers. Carol then points her phone at Sam's phone. Sam starts an application on his handset to initiate chatting with Carol. Carol's handset receives the IR beam and produces the display illustrated in FIG. 10A. If Carol accepts, Sam and Carol then begin exchanging SMS messages. Using the server based approach, Sam and Carol can exchange messages even though they do not know each other's number. They can then move out of IR range and still communicate.

In scenario two, Julia is at a party with some of her friends and many other people that she doesn't really know. She meets someone named "John" who seems friendly. John asks for Julia's number. Julia is reluctant to give out her number because she has had problems in the past, so she says that she will give John her e-calling card. John and Julia line up the IR ports on their phones. John invokes the "ask for e-calling card" on his handset. When Julia's handset receives the beam the handset produces the display illustrated in FIG. 10B.

Figure 10A:
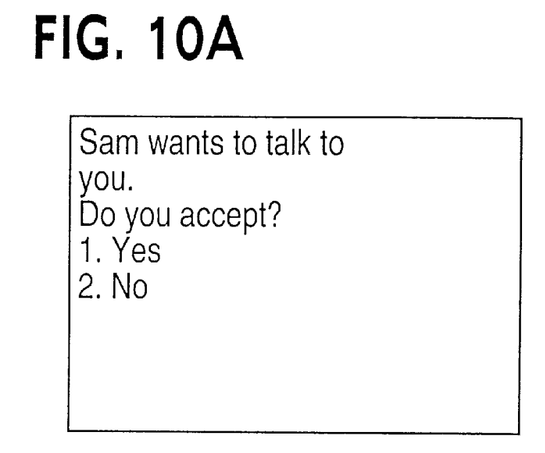
FIGS. 10A, 10B, 10C and 10D are screen shots illustrating examples of the displays which are provided on wireless handsets in the course of operation of the method and apparatus of the present invention.
Figure 10B:
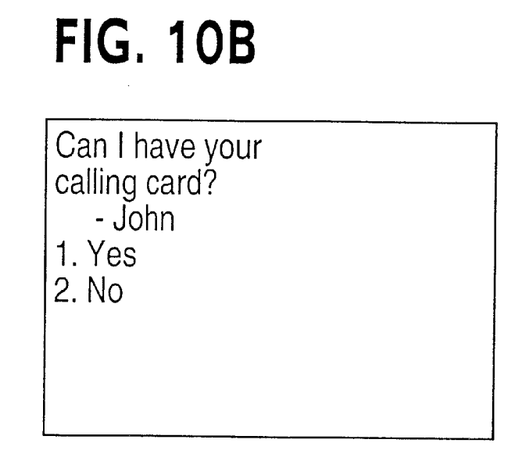
Figure 10C:
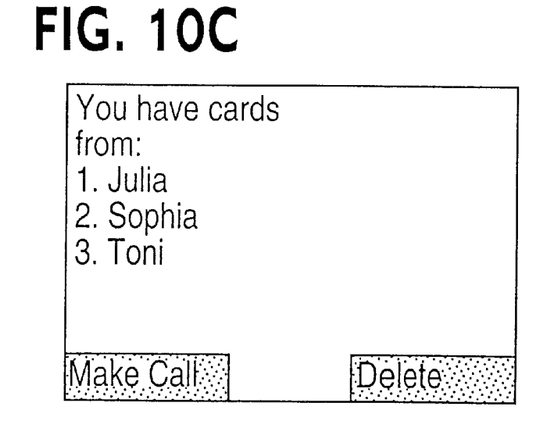

Later that night John returns home. He had a good time at the party. He remembers talking to someone and getting her e-calling card. He checks his list of e-calling cards on his handset and his handset produces a display of the e-calling cards he has collected, as illustrated in FIG. 10C. He selects Julia's name and selects "make a call". John's handset does not directly make the call because it does not have Julia's telephone number. Instead, the e-calling card application contacts the server which originally passed out an instance of Julia's e-calling card to give to John. The server takes the e-calling card ID, completes the e-calling card, and looks up the telephone numbers for the two parties involved in the original e-calling card exchange. The server then calls both parties and bridges the call. From the user's (i.e., John's) perspective, he simply presses "make call" and then his phone rings and he is talking to Julia.

Figure 10D:
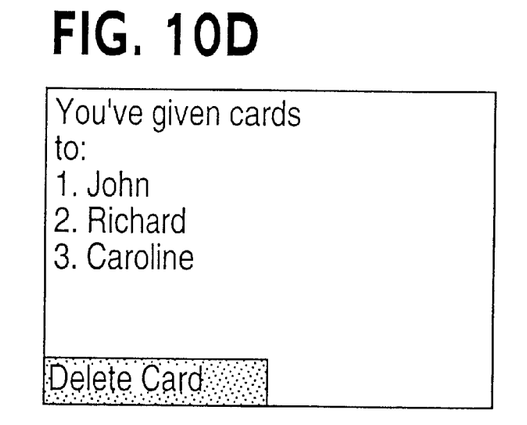

John and Julia talk on the phone but things do not go well. Julia realizes they have nothing in common. After the call, Julia turns on her handset and looks at the e-calling cards she has passed out, as illustrated in FIG. 10D. She selects the card she passed out to John and deletes it. The server is informed of the deletion by communication with Julia's handset. Later, John attempts to use Julia's e-calling card but the e-calling card application on John's handset tells John that Julia has withdrawn her e-calling card.

The many features and advantages are apparent from the detailed specification, and thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of facilitating communication between first and second parties, comprising:
   supplying a token to the first party, the token being associated with contact information, by which the first party can electronically contact the second party without revealing the contact information to the first party, and being automatically associated only with the first party;
   storing the token; and
   revoking the token in response to a request from the second party.

2. A method as set forth in claim 1, further comprising the first party requesting communication with a second party by using the stored token.

3. A method as set forth in claim 2, wherein the communication is voice communication.

4. A method as set forth in claim 2, wherein the communication is text messaging.

5. A method as set forth in claim 1, further comprising requesting the token from the second party prior to said supplying the token.

6. A method as set forth in claim 5, wherein said requesting is carried out by electronic communication between the first and second parties.

7. A method as set forth in claim 6, wherein the electronic communication is infrared communication.

8. A method as set forth in claim 1, further comprising:
   assigning an expiration parameter to the token, such that the token is automatically deactivated based on the expiration parameter.

9. A method as set forth in claim 8, wherein the expiration parameter represents a predetermined number of contacts made by the second party.

10. A method as set forth in claim 8, wherein the expiration parameter is a date.

11. A method as set forth in claim 1, further comprising assigning the token a privacy parameter, so that the token cannot be redistributed to another party.

12. A method of facilitating communication between first and second communication devices, comprising:
    obtaining a token corresponding to contact information of the first communication device;
    storing the token in the second communication device without revealing the contact information, the token being automatically associated only with the second communication device; and
    revoking the token in response to a request from the first communication device.

13. A method as set forth in claim 12, further comprising requesting communication with the first communication device by using the token stored in the second communication device.

14. A method as set forth in claim 13, wherein the communication is voice communication.

15. A method as set forth in claim 13, wherein the communication is text messaging.

16. A method as set forth in claim 12, further comprising requesting the token from the first communication device prior to said obtaining the token.

17. A method as set forth in claim 16, wherein said requesting is carried out by electronic communication between the first and second communication devices.

18. A method as set forth in claim 17, wherein the electronic communication comprises infrared communication.

19. An apparatus facilitating communication between first and second communication devices, comprising a computer to receive a request for a token from the first communication device, to provide the token to the first communication device, and to set up communication between the first and second communication devices when the computer receives a request including the token from the second communication device, the token being automatically associated only with the second communication device, wherein the token is deleted from the computer in response to a request from the first communication device.

20. An apparatus as set forth in claim 19, wherein the second communication device has previously electronically requested the token from the first communication device.

21. An apparatus facilitating communication between first and second communication devices, comprising:
    means for obtaining a token corresponding to contact information of the first communication device;
    means for storing the token in the second communication device, so that a user of the second communication device can electronically contact the first communication device, without revealing the contact information to the user of the second communication device, the token being automatically associated only with the second communication device; and
    means for revoking the token in response to a request from the first communication device.

22. An apparatus facilitating communication, comprising a first communication device receiving a request for communication from a second communication device, creating a token associated with contact information by which the first communication device can be electronically contacted by the second communication device without revealing the contact information to a user of the second communication device, and forwarding the token to the second communication device, the token being automatically associated only with the second communication device.

23. An apparatus as set forth in claim 22, wherein a user of the second communication device initiates communication with the first communication device based on the token.

24. A token facilitating communication between first and second parties, comprising identification information associated with contact information by which the first party can electronically contact the second party without revealing the contact information to the first party, the token being automatically associated only with the first party.

25. A token as set forth in claim 24, wherein the contact information is a telephone number.

26. A token as set forth in claim 24, wherein the contact information is a pager number.

27. A token as set forth in claim 24, wherein the contact information is an e-mail address.

28. A method of facilitating communication between first and second communication devices comprising:
    obtaining a token corresponding to contact information of the first communication device in response to an electronic request from the second communication device;
    storing the token in the second communication device;
    using the token in the second communication device to electronically contact the first communication device without revealing the contact information of the first communication device to the second communication device, the token being automatically associated only with the second communication device; and
    revoking the token based on operation of the first communication device.

29. A method as set forth in claim 28, wherein the contact information is a telephone number.

30. A method as set forth in claim 28, wherein the communication which is facilitated is voice communication.

31. A method as set forth in claim 28, wherein the communication which is facilitated is text messaging.

32. A method as set forth in claim 28, wherein the electronic request from the second communication device is carried out by infrared communication.

33. A computer readable storage controlling a computer to facilitate communication between first and second communication devices by obtaining a token corresponding to contact information of the first communication device, and causing the token to be stored in the second communication device without revealing the contact information, and revoking the token in response to a request from the first communication device, the token being automatically associated only with the second communication device.

* * * * *

UNITED STATES PATENT AND TRADEMARK OFFICE
CERTIFICATE OF CORRECTION

PATENT NO. : 6,744,869 B2
DATED : June 1, 2004
INVENTOR(S) : Allan E. Brockenbrough et al.

It is certified that error appears in the above-identified patent and that said Letters Patent is hereby corrected as shown below:

<u>Title page,</u>
Item [56], References Cited, OTHER PUBLICATIONS, "Web Page" reference, after "Web Page" insert -- http.//www/ -- (all 3 references).

Signed and Sealed this

Second Day of August, 2005

JON W. DUDAS
*Director of the United States Patent and Trademark Office*